US007929246B2

(12) United States Patent
Takemori et al.

(10) Patent No.: US 7,929,246 B2
(45) Date of Patent: Apr. 19, 2011

(54) MAGNETIC DISK DRIVE WITH SPOILER (75) Inventors: Keiichi Takemori, Ibaraki (JP); Masato Ikegawa, Ibaraki (JP); Hiroshi Mukai, Ibaraki (JP); Hiroyuki Ishii, Nishikamo (JP); Yukinobu Abe, Chiba (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 917 days.

(21) Appl. No.: 11/810,267

(22) Filed: Jun. 4, 2007

(65) Prior Publication Data
US 2008/0043369 A1    Feb. 21, 2008

(30) Foreign Application Priority Data

Jun. 5, 2006  (JP) ................. 2006-155875

(51) Int. Cl.
*G11B 33/14* (2006.01)
*G11B 5/55* (2006.01)
(52) U.S. Cl. .................. 360/97.02; 360/265.9
(58) Field of Classification Search .......... None
See application file for complete search history.

(56) References Cited

U.S. PATENT DOCUMENTS

| | | | | |
|---|---|---|---|---|
| 5,134,530 | A * | 7/1992 | Hall ........................ | 360/97.03 |
| 5,801,899 | A * | 9/1998 | Genheimer ............. | 360/97.01 |
| 6,115,214 | A * | 9/2000 | Allsup et al. .......... | 360/254.3 |
| 6,226,145 | B1 * | 5/2001 | Genheimer et al. .... | 360/97.02 |
| 6,271,987 | B1 * | 8/2001 | Allsup et al. .......... | 360/97.03 |
| 6,449,119 | B1 * | 9/2002 | Hashizume et al. .... | 360/97.03 |
| 6,477,000 | B1 * | 11/2002 | Pottebaum et al. ..... | 360/97.02 |
| 6,535,350 | B1 * | 3/2003 | Genheimer et al. .... | 360/97.02 |
| 6,545,842 | B2 * | 4/2003 | Rao et al. .............. | 360/244.2 |
| 2002/0071202 | A1 * | 6/2002 | Myokan et al. ......... | 360/97.02 |
| 2002/0196581 | A1 * | 12/2002 | Tsang et al. ............ | 360/97.02 |

FOREIGN PATENT DOCUMENTS

| | | |
|---|---|---|
| JP | 06-084313 | 3/1994 |
| JP | 2004-171713 | 6/2004 |
| JP | 2004-234784 | 8/2004 |

* cited by examiner

*Primary Examiner* — David D Davis (57) ABSTRACT

Embodiments of the present invention prevent a magnetic disk drive from increasing in size and in manufacturing cost and reduces a positioning error of a magnetic head. An embodiment of a magnetic disk drive in accordance with the present invention includes: a disk-shaped magnetic disk that is rotated and driven; a magnetic head that reads and writes information to and from the magnetic disk, an arm that supports and moves the magnetic head; a spoiler that is close to a disk surface and extends in a radial direction of the disk; and a cabinet that houses these parts. The spoiler is disposed closer to an upstream side in a rotational direction of the disk than the arm and has a flow rate suppressing clearance positioned in a central portion in a peripheral direction of the spoiler, opened to both sides in an axial direction, and formed in a shape elongated in a radial direction of the disk.

8 Claims, 6 Drawing Sheets

MAGNETIC DISK DRIVE WITH SPOILER

CROSS-REFERENCE TO RELATED APPLICATION

The instant nonprovisional patent application claims priority to Japanese Application No. 2006-155875 filed Jun. 5, 2006 and incorporated by reference in its entirety herein for all purposes

BACKGROUND OF THE INVENTION

An ordinary magnetic disk drive has a structure in which a single or a plurality of magnetic disks are disposed coaxially and driven by spindle motor. Reading or writing of information from or to the magnetic disk is performed by a magnetic head opposed to the magnetic disk. The magnetic head is supported by an arm and is driven by an actuator, thereby being able to access to respective tracks on the magnetic disk.

In general, performance required of a magnetic disk drive is measured by a storage capacity and a speed of reading or writing information, and various techniques are employed to improve the performance. The improved performance of the storage capacity can be achieved by increasing an information storage capacity per magnetic disk. Moreover, the improved performance of the speed of the reading or writing information can be achieved by increasing the number of revolutions of a magnetic disk to reduce time required to read and write information.

As described above, the techniques for improving the performance of the magnetic disk drive are employed, and factors responsible for determining the success or failure of these techniques include the positioning error of a magnetic head. The positioning error of a magnetic head means a relative position deviation between a target track and a magnetic head. When this positioning error is reduced, a track width can be also reduced and hence a higher-density large-capacity magnetic disk drive can be designed.

When the number of revolutions of a disk is simply increased to increase the speed of reading or writing information, the turbulence of an air flow caused by the rotation of the magnetic disk becomes larger, and hence causes an increase in the vibrations of an arm supporting the magnetic head and an increase in disk flutter that is the vibration of the magnetic disk itself. As a result, this makes the positioning error of the magnetic head worse, and hence makes it difficult to improve or maintain a recording density.

Thus, there is a tradeoff relationship between the narrowing of a track width to improve a recoding density, and the increasing of the number of revolutions of a disk to improve the speed of reading or writing information. To improve the performance required for magnetic disk drive, it is necessary to take some countermeasures to solve the tradeoff relationship.

In the number of revolutions of a disk of the present 3.5-type magnetic disk drive, 7,200 $min^{-1}$ becomes predominant for a desktop and 10,000 to 15,000 $min^{-1}$ becomes predominant for a server, respectively. Moreover, the storage capacity becomes approximately 500 Gbyte at the maximum. Required performances are an improved storage capacity and an improved speed of reading or writing information. However, against a backdrop such that multimedia becomes widespread and rapidly increases the quantity of information in the present product market, an improvement in the storage capacity becomes an important performance evaluation indicator of a product.

One way to improve storage capacity, that is, for increasing a storage capacity, is a method for narrowing a track width to increase a density. This requires reducing the positioning error of the magnetic head.

The main factor of the positioning error of the magnetic head, as described above, is a fluid force caused by the turbulence of air flow developed by the rotation of the magnetic disk. Conventional methods for reducing a fluid force include a method of disposing a straightening plate called a spoiler near the magnetic head. This straightening plate produces an effect of suppressing a flow directly hitting on the magnetic head or the arm to suppress the varying force of fluid applied to the magnetic head of the arm.

Here, patent documents relating to this spoiler include, for example, Japanese Patent Publication No. 6-84313 ("patent document 1") and Japanese Patent Publication No. 2004-234784 ("patent document 2").

Moreover, a technique for suppressing the vibrations of an actuator arm caused by the turbulence to provide a magnetic disk drive of high positioning accuracy is disclosed in Japanese Patent Publication No. 2004-171713 ("patent document 3"). In this magnetic disk drive, against a whirling air flow flowing on a disk surface along with the high rotation speed of the disk, there are provided a branch flow passage bypassing an actuator and two spoilers for introducing the air flow into the branch flow passage, the two spoilers being disposed on the upstream and downstream portions of the actuator arm. With this, the magnetic disk drive makes the most part of the whirling air flow bypass the actuator into the branch flow passage to reduce an air flow rate to the actuator arm.

However, in order to realize a larger-capacity magnetic disk drive, a structure is required that produces an effect larger than an effect produced by the spoiler shown in the patent documents 1 and 2.

Moreover, the magnetic disk drive shown in patent document 3 has a complicated structure requiring the branch flow passage and hence raises a problem of upsizing a disk drive and increasing manufacturing cost.

BRIEF SUMMARY OF THE INVENTION

Embodiments of the present invention prevent a magnetic disk drive from increasing in size and in manufacturing cost and to reduce a positioning error of a magnetic head. According to the particular embodiment of FIG. 1, a magnetic disk drive 50 includes: a disk-shaped magnetic disk 1 that is rotated and driven; a magnetic head that reads and writes information to and from the magnetic disk 1; an arm 8 that supports and moves the magnetic head; a spoiler 11 that is close to a disk surface and extends in a radial direction of the disk; and a cabinet 5 that houses these parts. The spoiler 11 is disposed closer to an upstream side in a rotational direction of the disk than the arm 8 and has a flow rate suppressing clearance 13 positioned in a central portion in a peripheral direction of the spoiler 11, opened to both sides in an axial direction, and formed in a shape elongated in a radial direction of the disk.

DETAILED DESCRIPTION OF THE INVENTION

Embodiments in accordance with the present invention relate to a magnetic disk drive and, in particular, to a technology for reducing a head positioning error caused by an air flow developed when a magnetic disk drive rotates.

An object of embodiments of the present invention is to prevent the disk drive from increasing in size and manufacturing cost, to reduce the positioning error of the magnetic head, and to thereby provide a higher density larger-capacity magnetic disk drive.

To achieve the above-mentioned object, embodiments of the invention disclose a magnetic disk drive including: a disk-shaped magnetic disk that is rotated and driven; a magnetic head that reads and writes information to and from the magnetic disk; an arm that supports and moves the magnetic head; a spoiler that is close to a disk surface and extends in a radial direction of the disk; and a cabinet that houses the magnetic disk, the magnetic head, the arm, and the spoiler, wherein the spoiler is disposed closer to an upstream side in a rotational direction of the disk than the arm and has a flow rate suppressing clearance positioned in a central portion in a peripheral direction of the spoiler, opened to both sides in an axial direction, and formed in a shape elongated in a radial direction of the disk.

More preferable specific construction examples of the invention are as follows:

(1) the spoiler includes a prism-shaped first spoiler portion that extends from outside an outer periphery of the disk to an inner peripheral side of the disk and a prism-shaped second spoiler portion that is disposed closer to a downstream side in the rotational direction of the disk than the first spoiler portion and extends from outside the outer periphery of the disk to the inner peripheral side of the disk, and the flow rate suppressing clearance is a space formed between the first spoiler portion and the second spoiler portion;

(2) the flow rate suppressing clearance is formed in such a way that an air flow passing above and below the first spoiler portion flows into the flow rate suppressing clearance in a shape of a Karman vortex;

(3) a size in a peripheral direction of the flow rate suppressing clearance ranges from 5 to 8 times a thickness of the first spoiler portion;

(4) the first spoiler portion and the second spoiler portion are disposed so as to extend in parallel from outside the outer periphery of the disk to the inner peripheral side of the disk;

(5) both of inner peripheral sides of the first spoiler portion and the second spoiler portion are made free ends, whereby the flow rate suppressing clearance is opened in a central direction of the disk;

(6) a length in the radial direction of the disk of the second spoiler portion is longer than a length in the radial direction of the disk of the second spoiler portion; and (7) the spoiler has a through hole formed therein, the through hole being made the flow rate suppressing clearance, both side portions of the through hole being made the first spoiler portion and the second spoiler portion.

According to embodiments of the present invention, it is possible to prevent the disk drive from increasing in size and manufacturing cost, to reduce the positioning error of the magnetic head, and to thereby realize a higher density larger-capacity magnetic disk drive.

A plurality of embodiments of the present invention will be described below with reference to the drawings. The same reference symbols in the respective embodiments and a comparative example denote the same or equivalent parts.

First Embodiment

The magnetic disk drive of a first embodiment of the invention is to be described with reference to FIG. 1 to FIG. 7.

Figure 1:
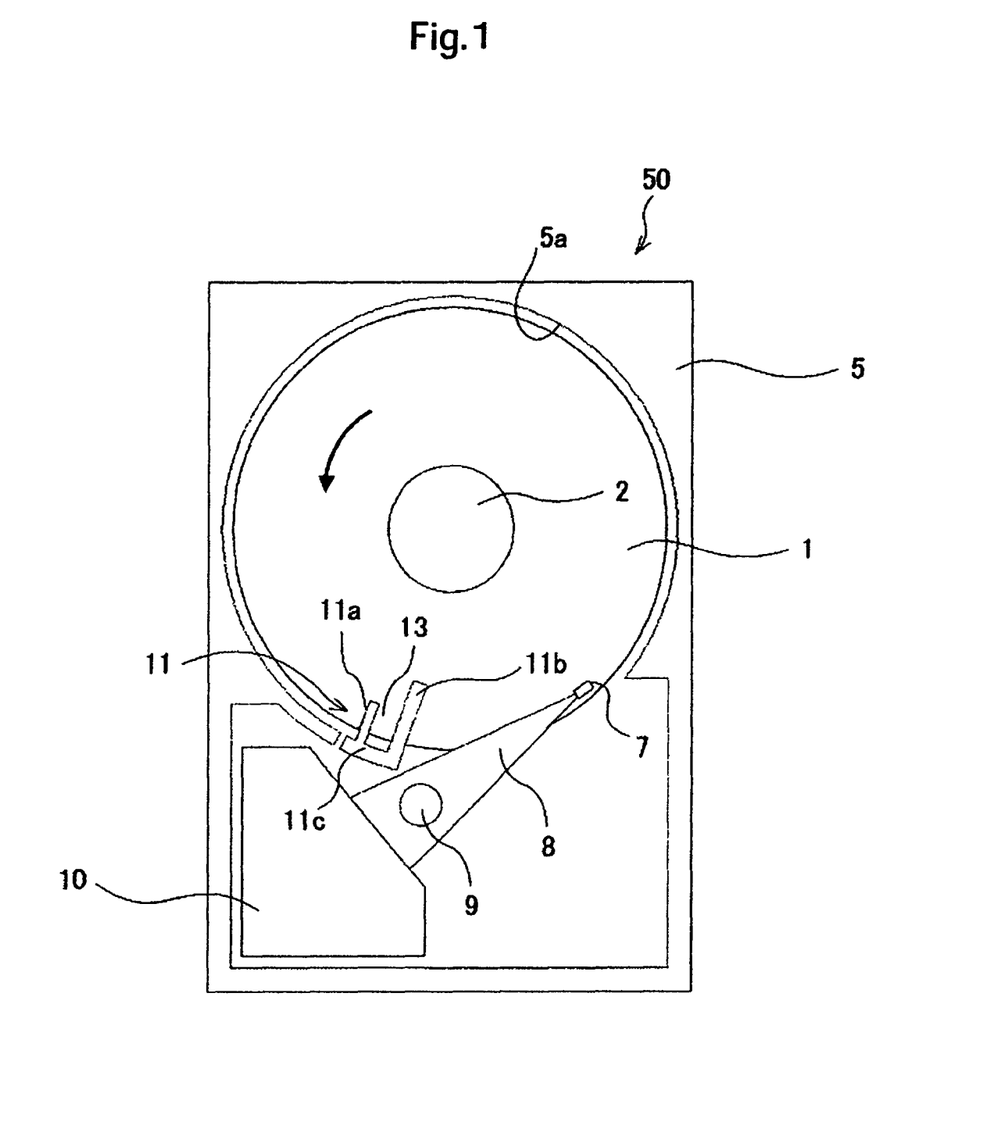
FIG. 1 is a plan view showing a state in which a top cover of a magnetic disk drive of a first embodiment of the invention is removed.
Figure 2:
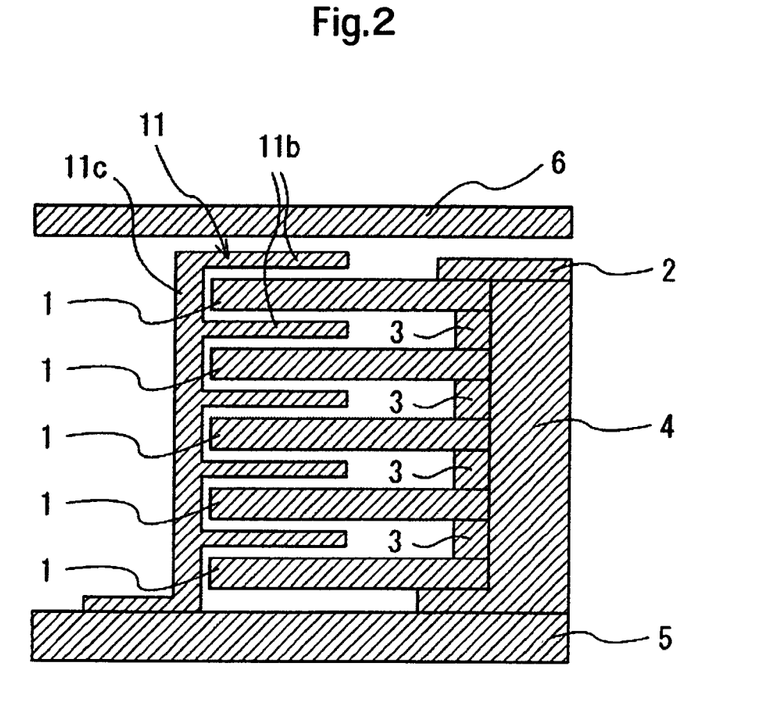
FIG. 2 is a longitudinal sectional view of the vicinity of a spoiler of the magnetic disk drive in FIG. 1.

First, referring to FIG. 1 and FIG. 2, the outline of a magnetic disk drive 50 of this embodiment will be described. FIG. 1 is a plan view showing a state in which a top cover 6 of the magnetic disk drive 50 of a first embodiment of the invention is removed. FIG. 2 is a longitudinal sectional view of the vicinity of a spoiler 11 of the magnetic disk drive 50 in FIG. 1.

The magnetic disk drive 50 is constructed of main constituent elements of a magnetic disk 1, a spindle motor 4, a cabinet 5, a top cover 6, a magnetic head (not shown), a suspension 7, an arm 8, a voice coil motor 10, and a spoiler 11.

The cabinet 5 has a space having the respective parts (1 to 4, 7 to 11) housed therein. The cabinet 5 has an opening in the top. The top cover 6 closes the opening to separate the interior of the cabinet 5 from the exterior. The cabinet 5 has a cabinet shroud surface 5a formed close to the outer peripheral edge of the magnetic disk 1 so as to surround the magnetic disk 1. A portion into which the arm 8 and the spoiler 11 are inserted into the magnetic disk 1 is not provided with the cabinet shroud surface 5a but is opened.

In the cabinet 5 are disposed a spindle having a plurality of disk-shaped magnetic disks 1 stacked thereon in layers and the spindle motor 4 for rotating the magnetic disks 1. In this embodiment, five magnetic disks 1 are stacked in layers on the spindle motor 4 for driving the disks 1 at a rated number of revolutions of 7,200 min$^{-1}$ counterclockwise in FIG. 1. Moreover, spacers 3 are disposed between the respective magnetic disks 1 to stack the magnetic disks 1 at predetermined spacings, and a disk damper 2 for clamping the respective magnetic disks 1 stacked in layers and the respective spacers 3 are provided. The disk damper 2 is fixed with screws to the spindle motor 4 in such a way as to press the uppermost magnetic disk 1. In this embodiment, the spacer 3 has a thickness of 2 mm and can stack the respective magnetic disks 1 in parallel at spacings of 2 mm. Embodiments of the invention are applicable even to a single magnetic disk 1.

The magnetic head for reading or writing magnetic information from or to the magnetic disk 1 is attached to the suspension 7 fixed to the tip of the arm 8 in such a way as to oppose to the respective recording surfaces of the magnetic disks 1. The arm 8 can rotate with an arm shaft 9 at a pivot and can move in the radial direction of the disk while supporting the magnetic head, thereby being able to move the magnetic head to a target track. The arm 8 is driven and controlled by the voice coil motor 10 of an actuator.

Figure 3:
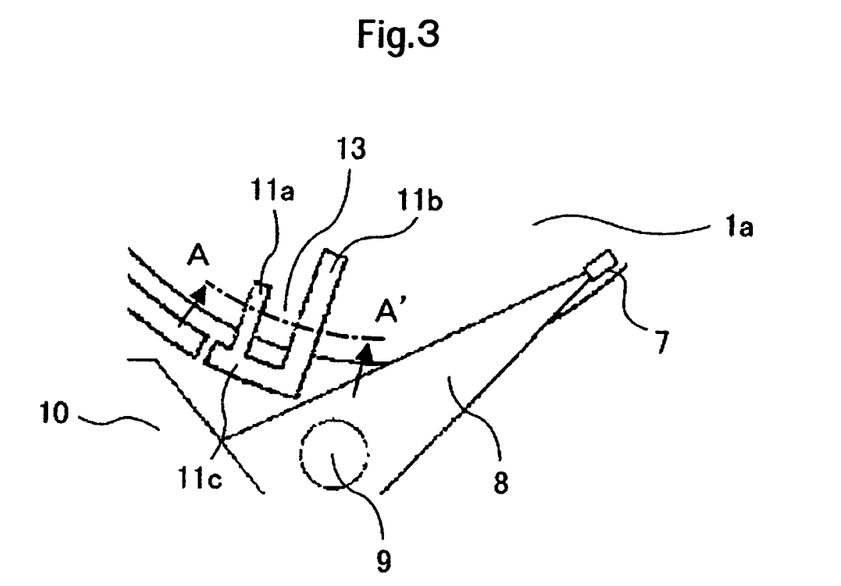
FIG. 3 is a plan view showing the vicinity of the spoiler of the magnetic disk drive in FIG. 1.
Figure 4:
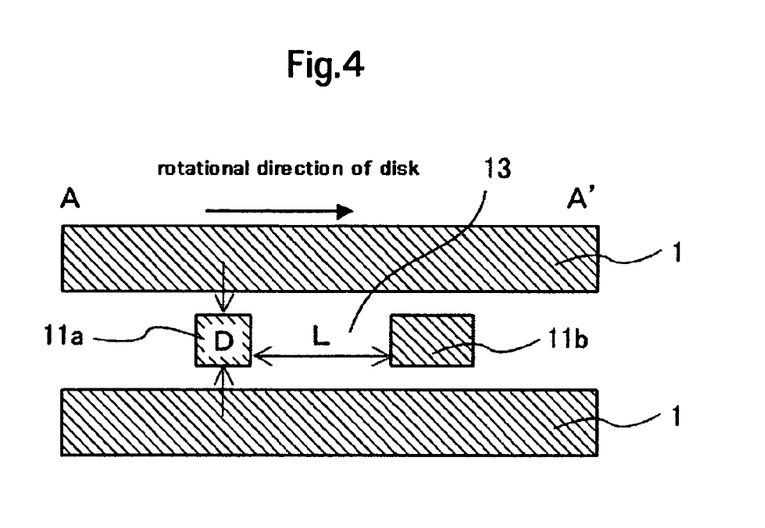
FIG. 4 is a sectional view along a line A-A' in FIG. 3.

Next, referring to FIG. 1 to FIG. 4, the spoiler 11 will be described in detail. FIG. 3 is a plan view showing the vicinity of the spoiler 11 of the magnetic disk drive 50 in FIG. 1. FIG. 4 is a sectional view along a line A-A' in FIG. 3.

Assuming that the rotational direction of the magnetic disk 1 is a downstream direction and its opposite direction is an upstream direction, the spoiler 11 is disposed close to the upstream side of the arm 8. Moreover, the spoiler 11 has a flow rate suppressing clearance 13 positioned in the central portion in the peripheral direction of the spoiler 11, opened to both sides in the axial direction, and formed in a shape elongated in the radial direction of the disk.

The spoiler 11 in this embodiment is constructed of a first spoiler portion 11a, a second spoiler portion 11b, and a spoiler shroud portion 11c for connecting the first spoiler portion 11a and the second spoiler portion 11b. The spoiler 11 is fixed to the cabinet 5 with screws or the like.

The first spoiler portion 11a is formed in the shape of a prism and is extended from the outside of the outer periphery of the disk to the inner peripheral side of the disk. The second spoiler 11b is disposed closer to a downstream side in the rotational direction of the disk than the first spoiler portion 11a, is formed in the shape of a prism, and is extended from the outside of the outer periphery of the disk to the inner peripheral side of the disk. The first spoiler portion 11a and the second spoiler 11b are disposed in such a way as to extend in parallel from the outside of the outer periphery of the disk to the inner peripheral side of the disk. A space formed between the first spoiler portion 11a and the second spoiler portion 11b construct the flow rate suppressing clearance 13.

Both inner peripheral sides of the first spoiler portion 11a and the second spoiler 11b are formed as open ends and the flow rate suppressing clearance 13 is opened also in the central direction of the disk. The length in the radial direction of the disk of the second spoiler portion 11b is longer than the length in the radial direction of the disk of the second spoiler portion 11a.

The first spoiler portion 11a and the second spoiler 11b are disposed also between the respective magnetic disks 1.

Moreover, the spoiler shroud portion 11c has a portion of a cylindrical surface having the rotational axis of the magnetic disk 1 at a central axis and partially surrounds the side surface of the magnetic disk 1. The spoiler shroud portion 11c has a substantially continuous spoiler shroud surface separated a small gap from the cabinet shroud surface 5a. The disk flutter of the magnetic disk 1 can be reduced also by this shroud surface. Moreover, the spoiler shroud portion 11c connects the first spoiler portion 11a and the second spoiler portion 11b, whereby these portions 11a, 11b, and 11c are integrated into one structure. With this, the spoiler 11 can be formed into a simple and inexpensive structure.

Embodiments of the invention are not limited to this integrated structure, but may be formed as separate structures, and the spoiler shroud portion 11c may be eliminated when necessary. Moreover, the first spoiler portions 11a and the second spoiler portions 11b disposed on the top surfaces of the respective magnetic disks 1 are constructed as an integrated structure, but may be constructed as separate structures.

In the spoiler 11 in this embodiment, the first spoiler portion 11a is constructed of a prism having a width of 2.0 mm, a length of 9.0 mm, and a thickness of 1.0 mm, and the second spoiler portion 11a is constructed of a prism having a width of 3.0 mm, a length of 15.5 mm, and a thickness of 1.0 mm. The first spoiler portion 11a and the second spoiler portion 11b are disposed in parallel or substantially in parallel to the recording surface of the magnetic disk 1 in a plane slightly separate from the recording surface of the magnetic disk 1 so as not to collide with the recording surface of the magnetic disk 1. In this embodiment, the gaps between the respective magnetic disks 1 are 2 mm, and the first spoiler portions 11a and the second spoiler portions 11b are arranged in the central planes between the respective recording surfaces of the magnetic disks 1, respectively. That is, the gaps between the recording surfaces of the magnetic disks 1 and the first spoiler portions 11a and the second spoiler portions 11b are 0.5 mm, respectively, and the first spoiler portions 11a and the second spoiler portions 11b are disposed in parallel to the recording surfaces of the magnetic disks 1, respectively.

The gap size between the first spoiler portion 11a and the second spoiler portion 11b, that is, a size in the peripheral direction of the flow rate suppressing clearance 13, is determined on the cylindrical surfaces having the rotational axis of the magnetic disk 1 at a central axis and having cross sections of the first spoiler portion 11a and the second spoiler portion 11b. When it is assumed that a length in the rotational axis direction of the magnetic disk 1 in the cross section of the first spoiler portion 11a (thickness of the first spoiler portion 11a) is D, and a distance between the rear end of the first spoiler portion 11a and the front end of the second spoiler portion 11b (gap size between the first spoiler portion 11a and the second spoiler portion 11b) is L, L is determined in such a way that L/D becomes from 5.0 to 8.0. In this embodiment, D=1 mm and L=5 mm.

Moreover, as a length to which the first spoiler portions 11a and the second spoiler portions 11b are inserted into the inner peripheral side from the spoiler shroud portion 11c becomes larger, an effect to suppress the air flow becomes larger and an effect to reduce a positioning error becomes higher. However, actually, there are problems of power consumption and collision of the spoiler 11 with the recording surface of the magnetic disk 1, so the length is determined so as to become an allowable length from a design viewpoint. In this embodiment, the length of the first spoiler portion 11a is set to 9.0 mm and the length of the second spoiler portion 11b is set to 15.5 mm. It is for the purpose of effectively introducing the air flow from the outer peripheral side to the inner peripheral side that the second spoiler portion 11b is longer than the first spoiler portion 11a. With this, it is possible to more effectively suppress the vibrations of the arm when the arm is at the outer periphery where a positioning error easily deteriorates.

Figure 5:
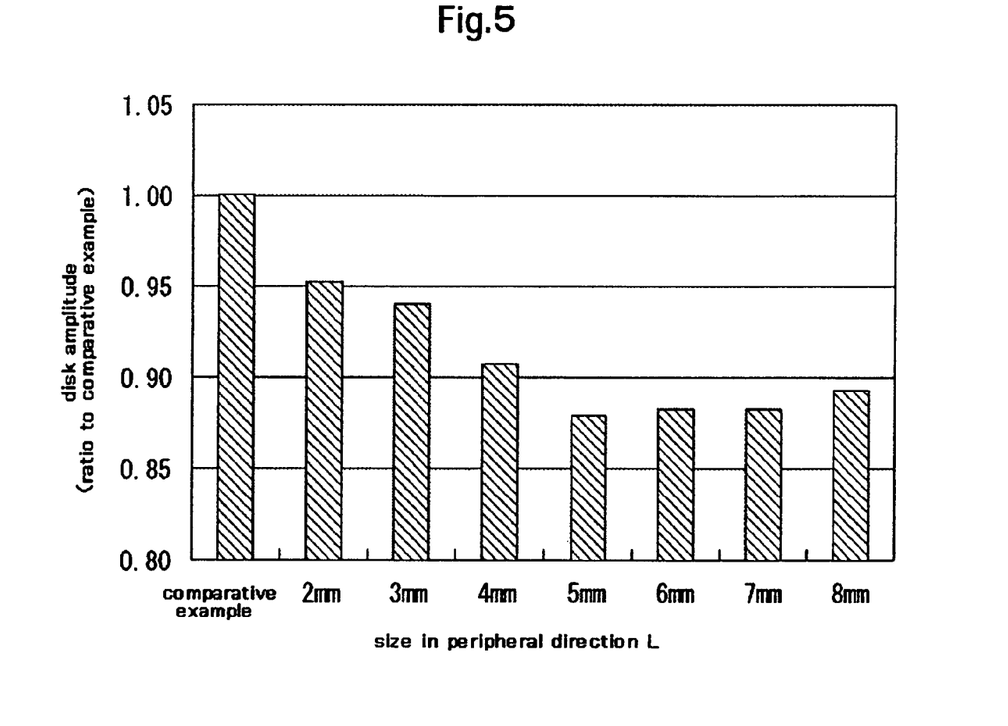
FIG. 5 is a graph showing measurement results of disk amplitude of a comparative example and disk flutter of the first embodiment when the size in the peripheral direction of a flow rate suppressing clearance is from 3 mm to 8 mm.

To check the effect of the spoiler 11 according to the embodiment, the amplitude in the external direction of the surface of the magnetic disk 1 was measured and the result obtained by integrating a component corresponding to disk flutter is shown in FIG. 5. FIG. 5 is a graph showing the measurement results of disk amplitude of a comparative example and disk flutter of this embodiment when the size L in the peripheral direction of the flow rate suppressing clearance 13 is from 2 mm to 8 mm.

Figure 6:
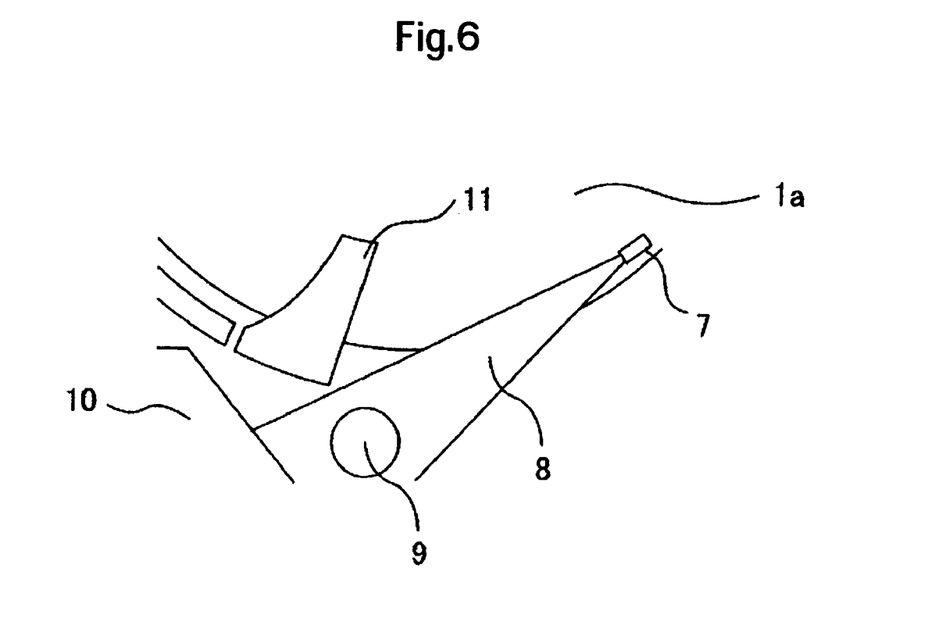
FIG. 6 is a plan view showing the vicinity of a spoiler of a comparative example.

The comparative example in FIG. 5, as shown in FIG. 6, is provided with a plate-shaped spoiler 11 not having the flow rate suppressing clearance 13 and the other construction of the comparative example is the same as this embodiment. In FIG. 5, the disk amplitude when the size L in the peripheral direction of the flow rate suppressing clearance 13 of this embodiment was changed from 3.0 mm to 8.0 mm is shown with reference to the disk amplitude of the comparative example. As a result, it was recognized that when L ranged from 2.0 mm to 5.0 mm, the disk flutter decreased substantially linearly and that a maximum effect of reducing disk flutter was 12% when L=5.0 mm. Moreover, it was recognized that although the effect of reducing disk flutter became lower gradually in a region where L was 6.0 mm or more, the effect of reducing disk flutter was 10% or more even when L=8.0 mm.

Figure 7:
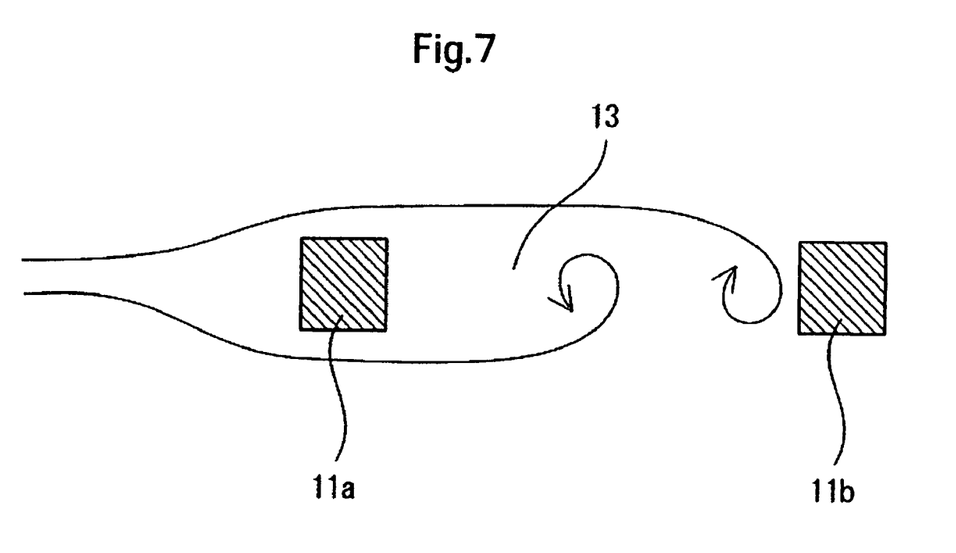
FIG. 7 is a graph showing a state in which a Karman vortex develops in a flow rate suppressing clearance of the first embodiment.

From these results, it was found that the spoiler 11 of this embodiment produced the effect of reducing disk flutter within a range where L was 8.0 mm or less; In particular, it was found that a large effect of reducing disk flutter could be produced within a range where L was from 5.0 mm to 8.0 mm. This effect of reducing disk flutter is produced by the following fact: as shown in FIG. 7, a vortex such as Karman vortex develops between the first spoiler portion 11a and the second spoiler portion 11b disposed in series to the air flow to cause an interference between the vortex and the second spoiler portion 11b to increase a drag coefficient (resistance to the air flow), thereby increasing the effect of suppressing the flow rate.

According to this embodiment, in the magnetic disk drive 50 including the disk-shaped magnetic disk 1 that is rotated and driven, the magnetic head that reads and writes information to and from the magnetic disk 1, the arm 8 that supports and moves the magnetic head, the spoiler 11 that is close to the disk surface and extends in the radial direction of the disk, and the cabinet 5 that houses these parts, the spoiler 11 is constructed so as to be disposed closer to the upstream side in the rotational direction of the disk than the arm 8 and to have the flow rate suppressing clearance 13 that is positioned in the central portion in the peripheral direction of the spoiler 11, is opened to both sides in the axial direction, and is formed in the shape elongated in the radial direction of the disk. Thus, it is possible to effectively reduce the flow rate of the air flow caused by the high rotation of the magnetic disk 1 by the spoiler 11 constructed of the small parts and hence to suppress also the fluctuation of the fluid. Accordingly, it is possible to prevent the disk drive from increasing in size and manufacturing cost, to reduce the positioning error of the magnetic head, and to thereby realize a higher density larger-capacity magnetic disk drive.

Second Embodiment

Figure 8:
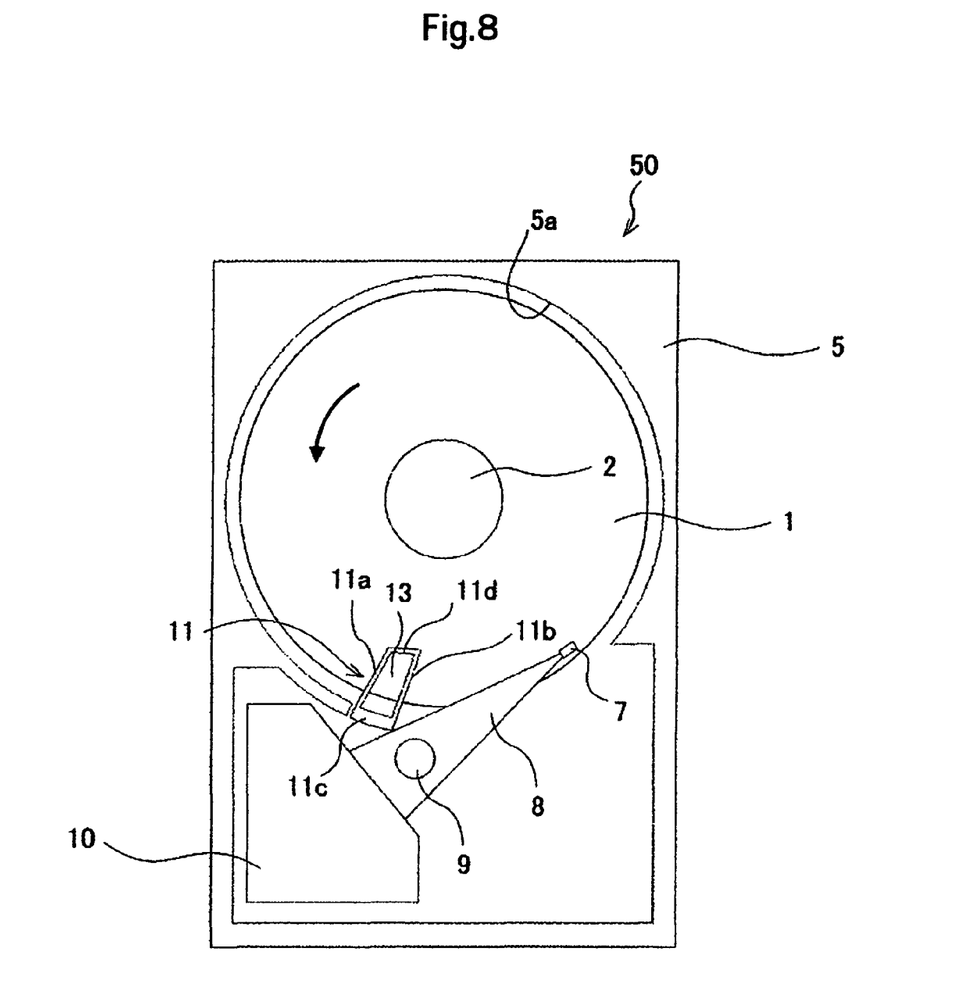
FIG. 8 is a plan view showing a state in which a top cover of a magnetic disk drive of a second embodiment of the invention is removed.
Figure 9:
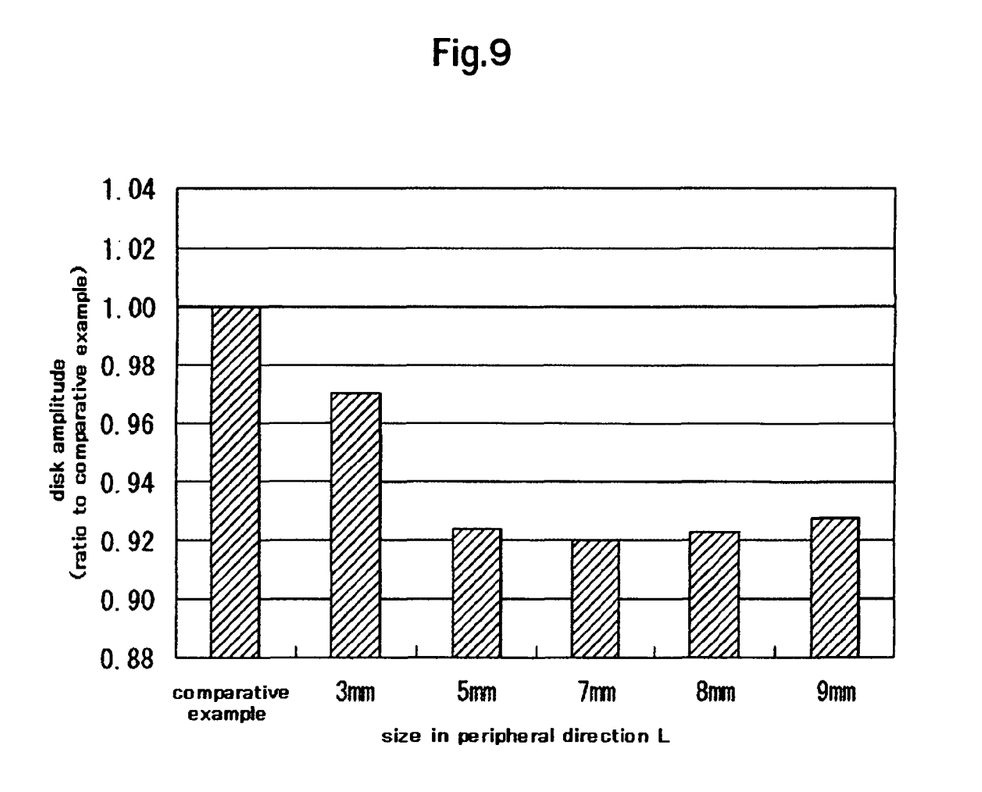
FIG. 9 is a graph showing measurement results of disk amplitude of a comparative example and disk flutter of the second embodiment when the size in the peripheral direction of a flow rate suppressing clearance is from 3 mm to 9 mm.

Next, the magnetic disk drive 50 of a second embodiment of the invention will be described with reference to FIG. 8 and FIG. 9. FIG. 8 is a plan view showing a state in which the top cover 6 of the magnetic disk drive 50 of a second embodiment of the invention is removed. FIG. 9 is a graph showing the disk amplitude of a comparative example and the disk amplitude of the second embodiment when the size L in the peripheral direction of the flow rate suppressing clearance 13 is from 3 mm to 8 mm. The second embodiment differs from the first embodiment in the point to be described below and is basically the same in the other points as the first embodiment, so duplicate descriptions will be omitted.

A spoiler 11 has a through hole in the direction of the normal to the recording surface of the magnetic disk 1 and this through hole becomes the flow rate suppressing clearance 13. The spoiler 11 is constructed of a first spoiler portion 11a, a second spoiler portion 11b, a spoiler shroud portion 11c and a tip connection portion 11d. The inside tip portion of the first spoiler portion 11a is connected to the inside tip portion of the second spoiler portion 11b by the tip connection portion 11d.

In the spoiler 11 in this second embodiment, the first spoiler portion 11a is constructed of a prism having a width of 1.0 mm, a length of 14.0 mm, and a thickness of 1.0 mm, the second spoiler portion 11b is constructed of a prism having a width of 1.0 mm, a length of 15.5 mm, and a thickness of 1.0 mm, and the tip connection portion 11d is constructed of a prism having a width of 1.0 mm, a length of 7.0 mm, and a thickness of 1.0 mm.

To check the effect of the spoiler 11 according to the second embodiment, like the first embodiment, the amplitude in the external direction of the surface of the magnetic disk 1 was measured and the result obtained by integrating a component corresponding to disk flutter is shown in FIG. 9. FIG. 9 is a graph showing the disk amplitude of a comparative example and the measurement results of disk flutter when the size L in the peripheral direction of the flow rate suppressing clearance 13 of the second embodiment is from 3 mm to 9 mm.

Experiments were conducted by setting the size L in the peripheral direction of the flow rate suppressing clearance 13 to 3 mm, 5 mm, 7 mm, 8 mm, and 9 mm with a comparative example as a reference shape. As a result, the effect of reducing disk flutter decreased monotonously until L became 5.0 mm, became minimum when L=7 mm, and decreased gradually when L became larger than 8 mm. In particular, the disk flutter decreased approximately 8% in the range in which L was from 5.0 mm to 8.0 mm, so it could be found that the large effect of reducing disk flutter was produced. This is the substantially same tendency as the first embodiment. At any rate, it is found that a large effect of reducing disk flutter is produced in the range in which L is 5.0 mm to 8.0 mm.

Moreover, the second embodiment has the tip connection portion 11d and hence can stabilize the position of the inside tip portion of the first spoiler portion 11a and the position of the inside tip portion of the second spoiler portion 11b, which can reduce the possibility that the spoiler 11 is brought into contact with the disk surface.

As far as the size L in the peripheral direction of the flow rate suppressing clearance is kept, a plurality of through holes may be formed. In this case, the strength of the spoiler 11 can be further increased.

What is claimed is:

1. A disk drive, comprising:
a cabinet;
a disk rotatably mounted to the cabinet, the disk having an axis of rotation;
an arm movably mounted to the cabinet, the arm having a head for reading data from the disk, and the arm defining an upstream side and a downstream side relative to rotation of the disk;
a spoiler mounted to the cabinet adjacent the disk and closer to the upstream side of the arm than the downstream side of the arm, the spoiler having a shroud with first and second portions extending radially from the shroud toward a central portion of the disk, the shroud and first and second portions defining a space therebetween that is open in an axial direction.

2. A disk drive according to claim 1, wherein the first and second portions comprise leading and trailing edges, respectively, with regard to the rotational direction of the disk, and the second portion is closer to the arm than the first portion.

3. A disk drive according to claim 1, wherein the spoiler is formed such that air flow passing around the first portion toward the second portion flows into the space as Karman vortices.

4. A disk drive according to claim 1, wherein the first portion has an axial thickness, and the space defines a distance between the first and second portions that ranges from 5 to 8 times the axial thickness of the first portion.

5. A disk drive according to claim 1, wherein the first portion and the second portion are parallel to each other, and the first and second portions have rectangular cross-sectional shapes in axial profile, rotational profile and radial profile.

6. A disk drive according to claim 1, wherein both of the first and second portions are cantilevered from the shroud, such that distal ends of the first and second portions are uncoupled to each other.

7. A disk drive according to claim 1, wherein the second portion has a longer radial length than the first portion.

8. A disk drive according to claim 1, wherein the first and second portions have distal ends that are coupled together with a third portion, and an axial through hole is defined between the shroud and the first, second and third portions.

* * * * *